US009888284B2

(12) United States Patent
Mate et al.

(10) Patent No.: US 9,888,284 B2
(45) Date of Patent: Feb. 6, 2018

(54) METHOD AND APPARATUS FOR IMPROVED STREAMING OF IMMERSIVE CONTENT

(71) Applicant: Nokia Technologies Oy, Espoo (FI)

(72) Inventors: Sujeet Shyamsundar Mate, Tampere (FI); Igor Danilo Diego Curcio, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/922,450

(22) Filed: Oct. 26, 2015

(65) Prior Publication Data
US 2017/0118508 A1  Apr. 27, 2017

(51) Int. Cl.
| H04N 21/44 | (2011.01) |
| H04N 21/218 | (2011.01) |
| H04N 21/2385 | (2011.01) |
| H04N 21/442 | (2011.01) |
| H04N 21/472 | (2011.01) |
| H04N 21/2343 | (2011.01) |
| G06F 3/01 | (2006.01) |
| G06F 17/30 | (2006.01) |

(52) U.S. Cl.
CPC ....... *H04N 21/44004* (2013.01); *G06F 3/012* (2013.01); *G06F 17/30781* (2013.01); *H04N 21/21805* (2013.01); *H04N 21/2343* (2013.01); *H04N 21/2385* (2013.01); *H04N 21/44218* (2013.01); *H04N 21/47208* (2013.01)

(58) Field of Classification Search
CPC ....... H04N 21/44004; H04N 21/21805; H04N 21/2385; H04N 21/44218; H04N 21/47208
See application file for complete search history.

(56) References Cited

U.S. PATENT DOCUMENTS

| 6,043,837 A * | 3/2000 | Driscoll, Jr. ......... H04N 5/2628 |
| | | 348/36 |
| 2002/0113805 A1 * | 8/2002 | Li ........................... G06T 15/20 |
| | | 345/649 |

(Continued)

FOREIGN PATENT DOCUMENTS

JP  2004-72694 A  3/2004

OTHER PUBLICATIONS

*Oculus, Best Practices Guide* [online] [retrieved Jan. 27, 2016] via the Internet Archive Wayback Machine at https://web.archive.org/web/20150419074359/http:/static.oculus.com/sdk-downloads/documents/Oculus_Best_Practices_Guide.pdf (Jan. 2015) 54 pages.

(Continued)

*Primary Examiner* — Randy Flynn
(74) *Attorney, Agent, or Firm* — Alston & Bird LLP

(57) ABSTRACT

Embodiments are disclosed for bandwidth-efficient streaming of immersive content. In the context of a method, an example embodiment includes causing generation of immersive content by an immersive content capture device, retrieving, from a memory, buffer information regarding a current view buffer (CVB), one or more pre-fetch buffers (PFBs), and a free viewpoint buffer (FVB), and causing transmission, by a streaming server, of portions of the immersive content to an immersive content viewing system based on the retrieved buffer information regarding the CVB, the one or more PFBs, and the FVB. A corresponding apparatus and computer program product are also provided.

20 Claims, 9 Drawing Sheets

(56) References Cited

U.S. PATENT DOCUMENTS

| | | | |
|---|---|---|---|
| 2003/0122949 A1* | 7/2003 | Kanematsu | H04N 21/4858 |
| | | | 348/333.01 |
| 2003/0161302 A1* | 8/2003 | Zimmermann | H04L 12/5693 |
| | | | 370/363 |
| 2004/0086186 A1 | 5/2004 | Kyusojin et al. | |
| 2007/0002131 A1 | 1/2007 | Ritchey | |
| 2008/0219351 A1* | 9/2008 | Kim | H04N 19/597 |
| | | | 375/240.16 |
| 2015/0139601 A1 | 5/2015 | Mate et al. | |
| 2015/0334299 A1* | 11/2015 | Tsuneno | G06T 7/2093 |
| | | | 348/36 |
| 2016/0012855 A1* | 1/2016 | Krishnan | H04N 21/816 |
| | | | 386/241 |

OTHER PUBLICATIONS

Extended European Search Report for corresponding European Application No. 16193609.1 dated Apr. 3, 2017.
Office Action for Korean Patent Application No. 10-2016-0139344 dated Oct. 31, 2017, with English translation, 13 pages.
Office Action for Japanese Patent Application No. 2016-208356 dated Dec. 5, 2017, with English summary, 10 pages.

* cited by examiner

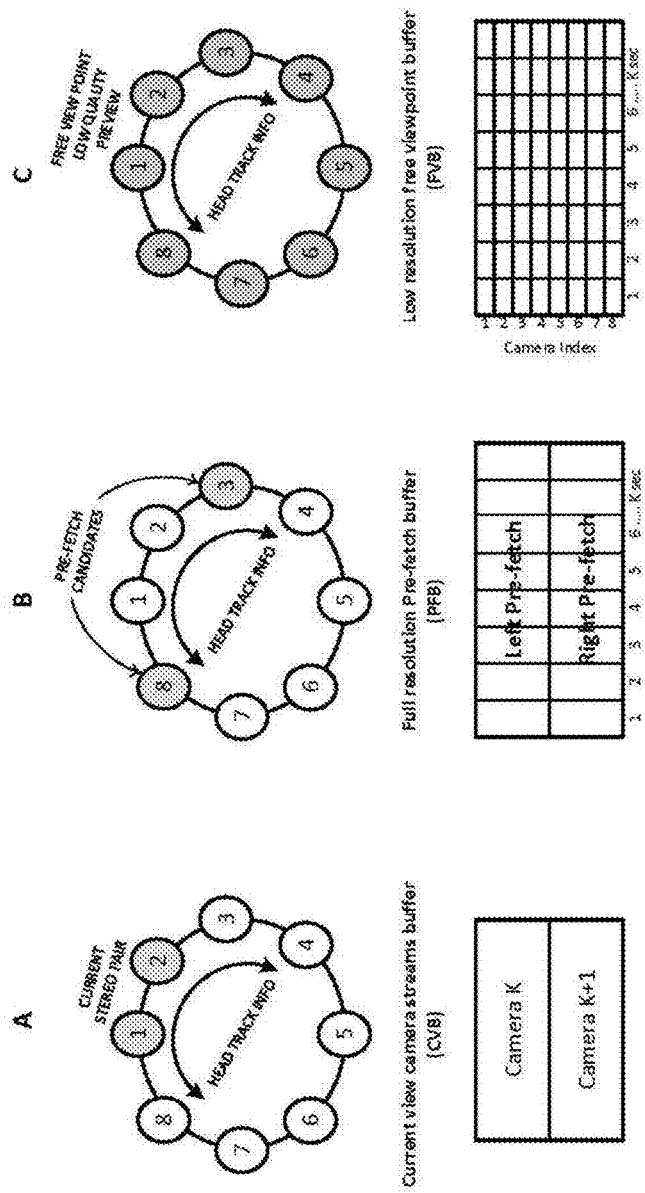

METHOD AND APPARATUS FOR IMPROVED STREAMING OF IMMERSIVE CONTENT

TECHNOLOGICAL FIELD

Example embodiments of the present invention relate generally to the transmission of immersive content and, more particularly, to a method and apparatus for bandwidth-efficient transmission of immersive content.

BACKGROUND

One type of immersive content comprises omnidirectional content. The capture of omnidirectional content usually involves multiple cameras (using conventional or fish-eye lenses), and the views from such cameras allow the generation of the omnidirectional content. Traditionally, streaming this type of content requires a large bandwidth commitment when compared to streaming of content generated by a single camera. However, for many users, it is not practical to dedicate such a large amount of bandwidth, and in many circumstances, it is not even possible.

BRIEF SUMMARY

The Oculus Best Practices Guide (available at http://static.oculus.com/sdk-downloads/documents/Oculus_Best-_Practices_Guide.pdf) includes a number of best practices for presenting immersive content using one prominent platform. This Best Practices Guide states that "[t]he display should respond to head-tracking and viewpoint changes at all times, without exception. Even when the game is paused or displaying a cutscene, users should be able to look around." Moreover, the Best Practices Guide states that "users must always have the freedom to look around the environment, which can add new requirements to the design of your content." These recommendations illustrate a desire to present a seamless viewing experience providing freedom of head movement. In combination with the fact that traditional modes of streaming immersive content require significant bandwidth commitments, these recommendations demonstrate the need for multiple camera streams that are accessible to a user with imperceptible latency in order to provide a satisfying user experience.

Accordingly, example embodiments described herein include methods, systems, and apparatuses for bandwidth-efficient streaming of immersive content that addresses the above requirements without compromising the immersive user experience. To do this, example embodiments utilize multiple buffers that store different portions of the immersive content at different levels of quality. Specifically, example embodiments utilize conventional streaming buffers that accumulate full consumption-quality content in a current view buffer (CVB). The content stored in the CVB is generally sourced from camera views of the immersive content corresponding to a user's current view. At the same time, however, such embodiments utilize Pre-Fetch Buffers (PFBs) for the one or more views that are adjacent to the current view, and these PFBs store intermediate or full consumption quality content. Finally, such embodiments may also utilize Free-Viewpoint Buffers (FVBs) for fast head movements, and these buffers store low quality panoramic content.

In a first example embodiment, a method is provided for bandwidth-efficient streaming of immersive content. The method includes causing generation of immersive content by an immersive content capturing module, retrieving, from a memory, buffer information regarding a current view buffer (CVB), one or more pre-fetch buffers (PFBs), and a free viewpoint buffer (FVB), and causing transmission, by a streaming server, of portions of the immersive content to an immersive content viewing system based on the retrieved buffer information regarding the CVB, the one or more PFBs, and the FVB.

In some embodiments, the method further includes receiving, by the immersion adaptation module and from an immersive content viewing system, a signaling message regarding one or more of the CVB, the one or more PFBs, or the FVB; and updating, by an immersion adaptation module, the buffer information regarding the CVB, PFBs, or the FVB based on the received signaling message.

In one such embodiment, the method may further include causing transmission, by the streaming server, of a signaling message identifying available camera views, a camera index corresponding to each of the available camera views, and a field of view corresponding to each of the available camera views, wherein the signaling message regarding the one or more of the CVB, the one or more PFBs, or the FVB is received in response to the transmission of the signaling message identifying the available camera views, the camera index corresponding to each of the available camera views, and the field of view corresponding to each of the available camera views. In another such embodiment, the signaling message identifies one or more camera indices associated with the CVB. In yet another such embodiment, the signaling message identifies one or more camera indices associated with the one or more PFBs. In this regard, the signaling message may identify a content quality level, and the portions of the immersive content transmitted to an immersive content viewing system may be further based on the content quality level.

In yet another such embodiment, the signaling message indicates utilization of the FVB and instructs the streaming server to pause transmission of the portions of the immersive content corresponding to the CVB or the one or more PFBs. And in yet another such embodiment, the signaling message instructs the streaming server to resume transmission of the portions of the immersive content corresponding to the CVB or the one or more PFBs.

In a second example embodiment, an apparatus is provided for bandwidth-efficient streaming of immersive content. The apparatus includes at least one processor and at least one memory including computer program code, the at least one memory and the computer program code configured to, with the at least one processor, cause the apparatus to cause generation of immersive content, retrieve buffer information regarding a current view buffer (CVB), one or more pre-fetch buffers (PFBs), and a free viewpoint buffer (FVB), and cause transmission of portions of the immersive content to an immersive content viewing system based on the retrieved buffer information regarding the CVB, the one or more PFBs, and the FVB.

In some embodiments, the at least one memory and the computer program code are further configured to, with the at least one processor, cause the apparatus to retrieve, from an immersive content viewing system, a signaling message regarding one or more of the CVB, the one or more PFBs, or the FVB; and updating, by an immersion adaptation module, the buffer information regarding the CVB, PFBs, or the FVB based on the received signaling message.

In one such embodiment, the at least one memory and the computer program code are further configured to, with the at least one processor, cause the apparatus to cause transmission, by the streaming server, of a signaling message identifying available camera views, a camera index corresponding to each of the available camera views, and a field of view corresponding to each of the available camera views, wherein the signaling message regarding the one or more of the CVB, the one or more PFBs, or the FVB is received in response to the transmission of the signaling message identifying the available camera views, the camera index corresponding to each of the available camera views, and the field of view corresponding to each of the available camera views.

In another such embodiment, the signaling message identifies one or more camera indices associated with the CVB. In yet another such embodiment, the signaling message identifies one or more camera indices associated with the one or more PFBs. In this regard, the signaling message may identify a content quality level, and the portions of the immersive content transmitted to an immersive content viewing system may be further based on the content quality level. In yet another such embodiment, the signaling message indicates utilization of the FVB and instructs the streaming server to pause transmission of the portions of the immersive content corresponding to the CVB or the one or more PFBs. And in yet another such embodiment, the signaling message instructs the streaming server to resume transmission of the portions of the immersive content corresponding to the CVB or the one or more PFBs.

In a third example embodiment, a computer program product is provided for bandwidth-efficient streaming of immersive content. The computer program product includes at least one non-transitory computer-readable storage medium having computer-executable program code portions stored therein, the computer-executable program code portions comprising program code instructions that, when executed, cause an apparatus to cause generation of immersive content, retrieve buffer information regarding a current view buffer (CVB), one or more pre-fetch buffers (PFBs), and a free viewpoint buffer (FVB), and cause transmission of portions of the immersive content to an immersive content viewing system based on the retrieved buffer information regarding the CVB, the one or more PFBs, and the FVB.

In some embodiments, the program code instructions, when executed, further cause the apparatus to retrieve, from an immersive content viewing system, a signaling message regarding one or more of the CVB, the one or more PFBs, or the FVB; and updating, by an immersion adaptation module, the buffer information regarding the CVB, PFBs, or the FVB based on the received signaling message.

In one such embodiment, the program code instructions, when executed, further cause the apparatus to cause transmission, by the streaming server, of a signaling message identifying available camera views, a camera index corresponding to each of the available camera views, and a field of view corresponding to each of the available camera views, wherein the signaling message regarding the one or more of the CVB, the one or more PFBs, or the FVB is received in response to the transmission of the signaling message identifying the available camera views, the camera index corresponding to each of the available camera views, and the field of view corresponding to each of the available camera views.

In another such embodiment, the signaling message identifies one or more camera indices associated with the CVB. In yet another such embodiment, the signaling message identifies one or more camera indices associated with the one or more PFBs. In this regard, the signaling message may identify a content quality level, and the portions of the immersive content transmitted to an immersive content viewing system may be further based on the content quality level. In yet another such embodiment, the signaling message indicates utilization of the FVB and instructs the streaming server to pause transmission of the portions of the immersive content corresponding to the CVB or the one or more PFBs. And in yet another such embodiment, the signaling message instructs the streaming server to resume transmission of the portions of the immersive content corresponding to the CVB or the one or more PFBs.

In a fourth example embodiment, an apparatus is provided for bandwidth-efficient streaming of immersive content. The apparatus includes means for causing generation of immersive content, means for retrieving buffer information regarding a current view buffer (CVB), one or more pre-fetch buffers (PFBs), and a free viewpoint buffer (FVB), and means for causing transmission of portions of the immersive content to an immersive content viewing system based on the retrieved buffer information regarding the CVB, the one or more PFBs, and the FVB.

In some embodiments, the apparatus further includes means for receiving, from an immersive content viewing system, a signaling message regarding one or more of the CVB, the one or more PFBs, or the FVB; and means for updating the buffer information regarding the CVB, PFBs, or the FVB based on the received signaling message.

In one such embodiment, the apparatus may further include means for causing transmission of a signaling message identifying available camera views, a camera index corresponding to each of the available camera views, and a field of view corresponding to each of the available camera views, wherein the signaling message regarding the one or more of the CVB, the one or more PFBs, or the FVB is received in response to the transmission of the signaling message identifying the available camera views, the camera index corresponding to each of the available camera views, and the field of view corresponding to each of the available camera views.

In another such embodiment, the signaling message identifies one or more camera indices associated with the CVB. In yet another such embodiment, the signaling message identifies one or more camera indices associated with the one or more PFBs. In this regard, the signaling message may identify a content quality level, and the portions of the immersive content transmitted to an immersive content viewing system may be further based on the content quality level. In yet another such embodiment, the signaling message indicates utilization of the FVB and instructs the streaming server to pause transmission of the portions of the immersive content corresponding to the CVB or the one or more PFBs. And in yet another such embodiment, the signaling message instructs the streaming server to resume transmission of the portions of the immersive content corresponding to the CVB or the one or more PFBs.

In a fifth example embodiment, a method is provided for bandwidth-efficient streaming of immersive content. The method includes receiving portions of immersive content from an immersive content serving system, storing the received portions of immersive content in one or more of a current view buffer (CVB), one or more pre-fetch buffers (PFBs) or a free viewpoint buffer (FVB), causing generation of displayable media from one of the CVB, the one or more PFBs or the FVB based on an orientation of a user's head, and causing display, by an immersive content consumption device, of the displayable media.

In some embodiments, the method further includes receiving, from the immersive content serving system, a signaling message identifying available camera views, a camera index corresponding to each of the available camera views, and a field of view corresponding to each of the available camera views, causing determination, by a head tracking module, of the orientation of the user's head, causing determination, by an immersive interactions-dependent adaptations module and based on the orientation of the user's head, of one or more camera indices associated with the CVB, and causing transmission, by the immersive interactions-dependent adaptations module, of a signaling message identifying the one or more camera indices associated with the CVB, wherein receiving the portions of the immersive content from the immersive content serving system occurs in response to transmission of the signaling message identifying the one or more camera indices associated with the CVB.

In some such embodiments, the method further includes causing determination, by the immersive interactions-dependent adaptations module and based on the orientation of the user's head, of one or more camera indices associated with the one or more PFBs, wherein the signaling message identifying the one or more camera indices associated with the CVB further identifies the one or more camera indices associated with one or more PFBs. In this regard, the signaling message may identify the one or more camera indices associated with the CVB, the one or more PFBs, or both further identifies a content quality level, and the received portions of the immersive content may be based on the content quality level.

In other such embodiments, the method further includes receiving, from the head tracking module, a view-change signal indicating a revised orientation of the user's head, and causing determination of whether the revised orientation of the user's head aligns with fields of view corresponding to the one or more camera indices associated with the CVB, wherein, in an instance in which the revised orientation of the user's head aligns with the fields of view corresponding to the one or more camera indices associated with the CVB, causing generation of the displayable media comprises causing generation of the displayable media from the CVB. In this regard, in an instance in which the revised orientation of the user's head does not align with a field of view associated with the one or more camera indices associated with the CVB, causing generation of the displayable media may include: causing determination of whether the revised orientation of the user's head aligns with a field of view corresponding to the one or more camera indices associated with one of the PFBs; in an instance in which the revised orientation of the user's head aligns with a field of view corresponding to the one or more camera indices associated with one of the PFBs, causing generation of the displayable media from one of the PFBs; and in an instance in which the revised orientation of the user's head does not align with a field of view corresponding to the one or more camera indices associated with one of the PFBs, causing generation of the displayable media from the FVB.

Furthermore, in response to causing generation of the displayable media from one of the PFBs, the method may further include causing transmission, by the immersive interactions-dependent adaptations module, of a CVB change signaling message instructing the immersive content serving system to associated, with the CVB, the one or more camera indices associated with the one of the PFBs from which the displayable media was generated.

Alternatively, in response to causing generation of the displayable media from the FVB, the method may further include causing transmission, by the immersive interactions-dependent adaptations module, of a pause signaling message instructing the immersive content serving system to pause transmission of portions of immersive content associated with the CVB or with the one or more PFBs.

In a sixth example embodiment, an apparatus is provided for bandwidth-efficient streaming of immersive content. The apparatus includes at least one processor and at least one memory including computer program code, the at least one memory and the computer program code configured to, with the at least one processor, cause the apparatus to receive portions of immersive content from an immersive content serving system, storing the received portions of immersive content in one or more of a current view buffer (CVB), one or more pre-fetch buffers (PFBs) or a free viewpoint buffer (FVB), cause generation of displayable media from one of the CVB, the one or more PFBs or the FVB based on an orientation of a user's head, and cause display of the displayable media to a user.

In some embodiments, the at least one memory and the computer program code are further configured to, with the at least one processor, cause the apparatus to receive, from the immersive content serving system, a signaling message identifying available camera views, a camera index corresponding to each of the available camera views, and a field of view corresponding to each of the available camera views, cause determination of the orientation of the user's head, cause determination, based on the orientation of the user's head, of one or more camera indices associated with the CVB, and cause transmission of a signaling message identifying the one or more camera indices associated with the CVB, wherein receiving the portions of the immersive content from the immersive content serving system occurs in response to transmission of the signaling message identifying the one or more camera indices associated with the CVB.

In some such embodiments, the at least one memory and the computer program code are further configured to, with the at least one processor, cause the apparatus to cause determination, based on the orientation of the user's head, of one or more camera indices associated with the one or more PFBs, wherein the signaling message identifying the one or more camera indices associated with the CVB further identifies the one or more camera indices associated with one or more PFBs. In this regard, the signaling message may identify the one or more camera indices associated with the CVB, the one or more PFBs, or both further identifies a content quality level, and the received portions of the immersive content may be based on the content quality level.

In other such embodiments, the at least one memory and the computer program code are further configured to, with the at least one processor, cause the apparatus to receive a view-change signal indicating a revised orientation of the user's head, and cause determination of whether the revised orientation of the user's head aligns with fields of view corresponding to the one or more camera indices associated with the CVB, wherein, in an instance in which the revised orientation of the user's head aligns with the fields of view corresponding to the one or more camera indices associated with the CVB, the at least one memory and the computer program code are further configured to, with the at least one processor, cause the apparatus to cause generation of the displayable media by causing generation of the displayable media from the CVB. In this regard, in an instance in which the revised orientation of the user's head does not align with a field of view associated with the one or more camera indices associated with the CVB, the at least one memory and the computer program code are further configured to, with the at least one processor, cause the apparatus to cause generation of the displayable media by: causing determination of whether the revised orientation of the user's head aligns with a field of view corresponding to the one or more camera indices associated with one of the PFBs; in an instance in which the revised orientation of the user's head aligns with a field of view corresponding to the one or more camera indices associated with one of the PFBs, causing generation of the displayable media from one of the PFBs; and in an instance in which the revised orientation of the user's head does not align with a field of view corresponding to the one or more camera indices associated with one of the PFBs, causing generation of the displayable media from the FVB.

Furthermore, in response to causing generation of the displayable media from one of the PFBs, the at least one memory and the computer program code are further configured to, with the at least one processor, cause the apparatus to cause transmission, by the immersive interactions-dependent adaptations module, of a CVB change signaling message instructing the immersive content serving system to associated, with the CVB, the one or more camera indices associated with the one of the PFBs from which the displayable media was generated.

Alternatively, in response to causing generation of the displayable media from the FVB, the at least one memory and the computer program code are further configured to, with the at least one processor, cause the apparatus to cause transmission, by the immersive interactions-dependent adaptations module, of a pause signaling message instructing the immersive content serving system to pause transmission of portions of immersive content associated with the CVB or with the one or more PFBs.

In a seventh example embodiment, a computer program product is provided for bandwidth-efficient streaming of immersive content. The computer program product includes at least one non-transitory computer-readable storage medium having computer-executable program code portions stored therein, the computer-executable program code portions comprising program code instructions that, when executed, cause an apparatus to receive portions of immersive content from an immersive content serving system, storing the received portions of immersive content in one or more of a current view buffer (CVB), one or more pre-fetch buffers (PFBs) or a free viewpoint buffer (FVB), cause generation of displayable media from one of the CVB, the one or more PFBs or the FVB based on an orientation of a user's head, and cause display of the displayable media to a user.

In some embodiments, the program code instructions, when executed, further cause the apparatus to receive, from the immersive content serving system, a signaling message identifying available camera views, a camera index corresponding to each of the available camera views, and a field of view corresponding to each of the available camera views, cause determination of the orientation of the user's head, cause determination, based on the orientation of the user's head, of one or more camera indices associated with the CVB, and cause transmission of a signaling message identifying the one or more camera indices associated with the CVB, wherein receiving the portions of the immersive content from the immersive content serving system occurs in response to transmission of the signaling message identifying the one or more camera indices associated with the CVB.

In some such embodiments, the program code instructions, when executed, further cause the apparatus to cause determination, based on the orientation of the user's head, of one or more camera indices associated with the one or more PFBs, wherein the signaling message identifying the one or more camera indices associated with the CVB further identifies the one or more camera indices associated with one or more PFBs. In this regard, the signaling message may identify the one or more camera indices associated with the CVB, the one or more PFBs, or both further identifies a content quality level, and the received portions of the immersive content may be based on the content quality level.

In other such embodiments, the program code instructions, when executed, further cause the apparatus to receive a view-change signal indicating a revised orientation of the user's head, and cause determination of whether the revised orientation of the user's head aligns with fields of view corresponding to the one or more camera indices associated with the CVB, wherein, in an instance in which the revised orientation of the user's head aligns with the fields of view corresponding to the one or more camera indices associated with the CVB, the program code instructions, when executed, further cause the apparatus to cause generation the displayable media by causing generation of the displayable media from the CVB. In this regard, in an instance in which the revised orientation of the user's head does not align with a field of view associated with the one or more camera indices associated with the CVB, the program code instructions, when executed, further cause the apparatus to cause generation of the displayable media by: causing determination of whether the revised orientation of the user's head aligns with a field of view corresponding to the one or more camera indices associated with one of the PFBs; in an instance in which the revised orientation of the user's head aligns with a field of view corresponding to the one or more camera indices associated with one of the PFBs, causing generation of the displayable media from one of the PFBs; and in an instance in which the revised orientation of the user's head does not align with a field of view corresponding to the one or more camera indices associated with one of the PFBs, causing generation of the displayable media from the FVB.

Furthermore, in response to causing generation of the displayable media from one of the PFBs, the program code instructions, when executed, may further cause the apparatus to cause transmission, by the immersive interactions-dependent adaptations module, of a CVB change signaling message instructing the immersive content serving system to associated, with the CVB, the one or more camera indices associated with the one of the PFBs from which the displayable media was generated.

Alternatively, in response to causing generation of the displayable media from the FVB, the program code instructions, when executed, may further cause the apparatus to cause transmission, by the immersive interactions-dependent adaptations module, of a pause signaling message instructing the immersive content serving system to pause transmission of portions of immersive content associated with the CVB or with the one or more PFBs.

In an eighth example embodiment, an apparatus is provided for bandwidth-efficient streaming of immersive content. The apparatus includes means for receiving portions of immersive content from an immersive content serving system, means for storing the received portions of immersive content in one or more of a current view buffer (CVB), one or more pre-fetch buffers (PFBs) or a free viewpoint buffer (FVB), causing generation of displayable media from one of the CVB, the one or more PFBs or the FVB based on an orientation of a user's head, and means for causing display of the displayable media to a user.

In some embodiments, the apparatus further includes means for receiving, from the immersive content serving system, a signaling message identifying available camera views, a camera index corresponding to each of the available camera views, and a field of view corresponding to each of the available camera views, means for causing determination of the orientation of the user's head, means for causing determination, based on the orientation of the user's head, of one or more camera indices associated with the CVB, and means for causing transmission of a signaling message identifying the one or more camera indices associated with the CVB, wherein receiving the portions of the immersive content from the immersive content serving system occurs in response to transmission of the signaling message identifying the one or more camera indices associated with the CVB.

In some such embodiments, the apparatus further includes means for causing determination, by the immersive interactions-dependent adaptations module and based on the orientation of the user's head, of one or more camera indices associated with the one or more PFBs, wherein the signaling message identifying the one or more camera indices associated with the CVB further identifies the one or more camera indices associated with one or more PFBs. In this regard, the signaling message may identify the one or more camera indices associated with the CVB, the one or more PFBs, or both further identifies a content quality level, and the received portions of the immersive content may be based on the content quality level.

In other such embodiments, the apparatus further includes means for receiving a view-change signal indicating a revised orientation of the user's head, and means for causing determination of whether the revised orientation of the user's head aligns with fields of view corresponding to the one or more camera indices associated with the CVB, wherein, in an instance in which the revised orientation of the user's head aligns with the fields of view corresponding to the one or more camera indices associated with the CVB, the means for causing generation of the displayable media comprises means for causing generation of the displayable media from the CVB. In this regard, in an instance in which the revised orientation of the user's head does not align with a field of view associated with the one or more camera indices associated with the CVB, the means for causing generation of the displayable media may include: means for causing determination of whether the revised orientation of the user's head aligns with a field of view corresponding to the one or more camera indices associated with one of the PFBs; means for, in an instance in which the revised orientation of the user's head aligns with a field of view corresponding to the one or more camera indices associated with one of the PFBs, causing generation of the displayable media from one of the PFBs; and means for, in an instance in which the revised orientation of the user's head does not align with a field of view corresponding to the one or more camera indices associated with one of the PFBs, causing generation of the displayable media from the FVB.

Furthermore, in response to causing generation of the displayable media from one of the PFBs, the apparatus may further include means for causing transmission, by the immersive interactions-dependent adaptations module, of a CVB change signaling message instructing the immersive content serving system to associated, with the CVB, the one or more camera indices associated with the one of the PFBs from which the displayable media was generated.

Alternatively, in response to causing generation of the displayable media from the FVB, the apparatus may further include means for causing transmission of a pause signaling message instructing the immersive content serving system to pause transmission of portions of immersive content associated with the CVB or with the one or more PFBs.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings, which are not necessarily drawn to scale, and wherein:

FIG. 4A illustrates information regarding a CVB, in accordance with example embodiments of the present invention;

FIG. 4B illustrates information regarding a PFB, in accordance with example embodiments of the present invention;

FIG. 4C illustrates information regarding a VVB, in accordance with example embodiments of the present invention;

DETAILED DESCRIPTION

Figure 1:
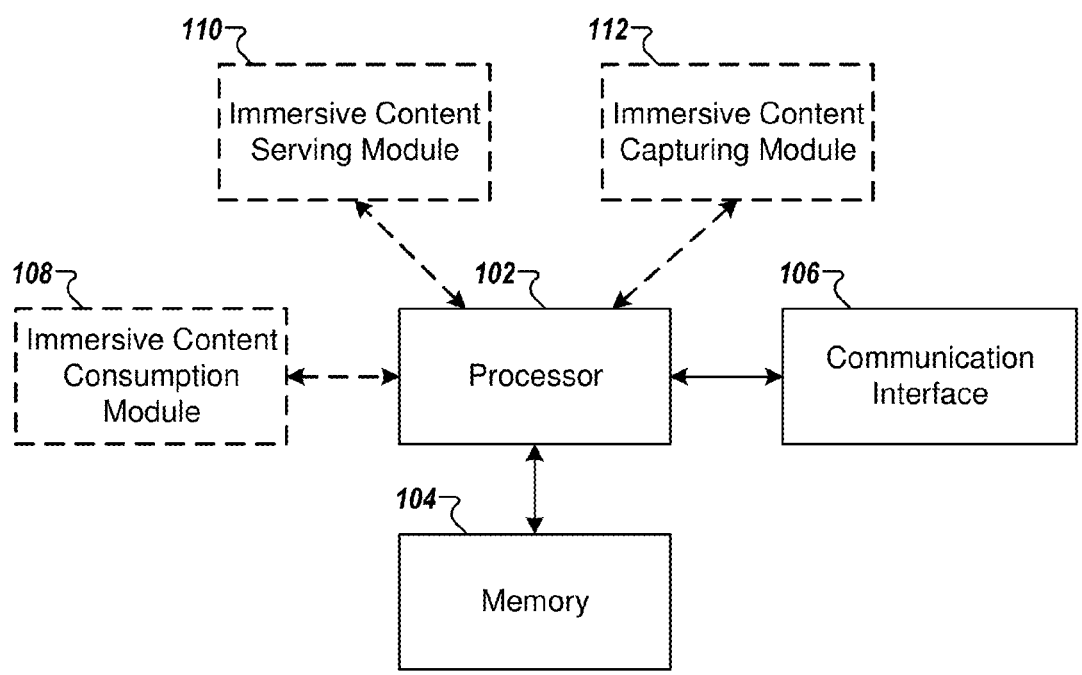
FIG. 1 illustrates a block diagram of an apparatus that may be specifically configured in accordance with example embodiments of the present invention.

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention.

Additionally, as used herein, the term "circuitry" refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of "circuitry" applies to all uses of this term herein, including in any claims. As a further example, as used herein, the term "circuitry" also includes an implementation comprising one or more processors and/or portion(s) thereof and accompanying software and/or firmware. As another example, the term "circuitry" as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., a volatile or non-volatile memory device), can be differentiated from a "computer-readable transmission medium," which refers to an electromagnetic signal.

Embodiments described herein demonstrate example methods, apparatuses, and computer program products that are designed to provide bandwidth-efficient streaming of immersive content. The methods described herein may be performed by (and the apparatuses, and computer program products may be embodied by) one or more of an immersive content serving system and an immersive content viewing system. The immersive content serving system may in some cases be embodied by (or in communication with) any of a variety of immersive content capturing devices, such as, for instance, Nokia's OZO presence-capture device, or any other device configured to capture content using multiple cameras, although the immersive content serving system may also be embodied by an apparatus which itself does not provide an immersive content capturing capability, but which may instead store immersive content previously captured using a separate immersive content capturing device. In turn, the immersive content viewing system may be embodied by (or in communication with) an immersive content consumption device, which comprises a device capable of rendering immersive content, such as a head-mounted display (e.g., the Oculus Rift™ or the like). The immersive content serving system and the immersive content viewing system are configured to communicate with each other via a network (e.g., a local area network (LAN), a wide area network (WAN) such as the Internet, or the like).

To enable bandwidth-efficient streaming of immersive content that addresses the above requirements described in the Oculus Best Practices Guide without compromising an immersive user experience, example embodiments utilize multiple buffers that store different portions of the immersive content at different levels of quality.

Specifically, example embodiments utilize conventional streaming buffers that accumulate full consumption-quality content in a CVB. The content utilizing the CVB is generally the camera view(s) of the immersive content corresponding to a user's current field of view. At the same time, however, such embodiments utilize PFBs for the one or more views that are adjacent to the current view, and these PFBs store intermediate or full consumption quality content of those adjacent views. Finally, such embodiments may also utilize FVBs for fast head movements, and these buffers store low quality panoramic content.

In such examples, pre-fetch camera indices are chosen based on the viewer's head position (and movements). Depending on the available bandwidth and the memory availability of the immersive content consumption device, the number of pre-fetched adjacent camera indices can be determined and/or adjusted. If the user moves her head such that the user's field of view is no longer contained within the first subset of camera views associated with the CVB, the rendering on the consumption device switches to a view provided by a PVB corresponding to the user's changed field of view (e.g., from the first subset of camera views to a second subset of camera views that contains the entirety of the user's field of view).

Subsequently, if the user's head movement stays within field of view (FOV) limits of the second subset of camera views, then the consumption device may signal a PFB-TO-CVB message to the immersive content serving system to prospectively utilize the CVB to buffer data from the second subset of camera views. Subsequently, the CVB buffers content from a set of cameras associated with the second subset of camera views.

Alternatively, if the user moves her head with high speed to viewpoints which are outside of the camera views associated with the CVB or the PFBs, the immersive content consumption device will render content from the FVBs. At this point, the immersive content viewing system may transmit a signal for the CVB and the PFBs to pause; consequently, the content from the FVBs is streamed until the user's head movement stops (or becomes slower than a predetermined threshold), at which point the immersive content viewing system sends a signal indicating that the CVB should prospectively buffer data from a set of cameras associated with a new subset of camera views. This signal may include identification of camera indices corresponding to the new subset of camera views. The corresponding PFBs may then be derived. In some embodiments, this derivation may be performed by the immersive content serving system, while in other embodiments, the derivation may be performed by the immersive content viewing system. In either type of embodiment, the derivation may be based on the new subset of camera views, based on the identified camera indices, or based on a parameter defining these adjacent views that can be transmitted by the immersive content viewing system in addition to the signal identifying the camera indices corresponding to the new subset of camera views.

Referring now to FIG. 1, a block diagram illustrates an example apparatus 100 that may embody an immersive content serving system or an immersive content viewing system. The apparatus 100 may include or otherwise be in communication with a processor 102, a memory 104, and a communication interface 106. When embodying an immersive content viewing system, the apparatus 100 further includes (or is in communication with) an immersive content consumption module 108. When embodying an immersive content serving system, the apparatus 100 further includes (or is in communication with) an immersive content serving module 110 and in some embodiments may further include (or be in communication with (an immersive content capturing module 112. The apparatus 100 may be embodied by a computing device, such as a computer terminal. However, in some embodiments, the apparatus may be embodied as a chip or chip set. In other words, the apparatus 100 may comprise one or more physical packages (e.g., chips) including materials, components, and/or wires on a structural assembly (e.g., a baseboard). The structural assembly may provide physical strength, conservation of size, and/or limitation of electrical interaction for component circuitry included thereon. The apparatus 100 may therefore, in some cases, be configured to implement aspects of the present invention on a single chip or as a single "system on a chip." As such, in some cases, a chip or chipset may constitute means for performing one or more operations for providing the functionalities described herein.

The processor 102 may be embodied in a number of different ways. For example, the processor 102 may be embodied as one or more of various hardware processing means such as a co-processor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 102 may include one or more processing cores configured to perform independently. A multi-core processor may enable multiprocessing within a single physical package. Additionally or alternatively, the processor 102 may include one or more processors configured in tandem via the bus to enable independent execution of instructions, pipelining, and/or multithreading.

In an example embodiment, the processor 102 may be configured to execute instructions stored in the memory 104 or otherwise accessible to the processor 102. Alternatively or additionally, the processor 102 may be configured to execute hard-coded functionality. As such, whether configured by hardware or software methods, or by a combination thereof, the processor 102 may represent an entity (e.g., physically embodied in circuitry) capable of performing operations according to an embodiment of the present invention while configured accordingly. Thus, for example, when the processor 102 is embodied as an ASIC, FPGA, or the like, the processor 102 may be specifically configured hardware for conducting the operations described herein. Alternatively, as another example, when the processor 102 is embodied as an executor of software instructions, the instructions may specifically configure the processor 102 to perform the algorithms and/or operations described herein when the instructions are executed. However, in some cases, the processor 102 may be a processor of a specific device (e.g., an endpoint device or a gateway device) configured to employ an embodiment of the present invention by further configuration of the processor by instructions for performing the algorithms and/or operations described herein. The processor 102 may include, among other things, a clock, an arithmetic logic unit (ALU), and logic gates configured to support operation of the processor 102.

In some embodiments, the processor 102 (and/or coprocessor or any other processing circuitry assisting or otherwise associated with the processor) may be in communication with the memory 104 via a bus for passing information among components of the apparatus. The memory 104 may be non-transitory and may include, for example, one or more volatile and/or non-volatile memories. In other words, for example, the memory 104 may be an electronic storage device (e.g., a computer readable storage medium) comprising gates configured to store data (e.g., bits) that may be retrievable by a machine (e.g., a computing device like the processor). The memory 104 may be configured to store information, data, content, applications, instructions, or the like, for enabling the apparatus to carry out various functions in accordance with an example embodiment of the present invention. For example, the memory 104 could be configured to buffer input data for processing by the processor 102. Additionally or alternatively, the memory 104 could be configured to store instructions for execution by the processor 102.

Meanwhile, the communication interface 106 may be any means such as a device or circuitry embodied in either hardware or a combination of hardware and software that is configured to receive and transmit data from and to one or more networks. In this regard, the communication interface 106 may include, for example, an antenna (or multiple antennas) and supporting hardware and/or software for enabling communications with a plurality of wireless communication networks. Additionally or alternatively, the communication interface 106 may include the circuitry for interacting with the antenna(s) to cause transmission of signals via the antenna(s) or to handle receipt of signals received via the antenna(s). In some environments, the communication interface 106 may additionally support wired communication. As such, for example, the communication interface 106 may include a communication modem and/or other hardware/software for supporting communication via cable, digital subscriber line (DSL), universal serial bus (USB), or other mechanisms. It should be understood that the communication interface 106 may, in various embodiments, include one or more proximity-based communication technologies that enable the apparatus 100 to communicate directly with another device (e.g., when apparatus 100 embodies an immersive content serving system, the other device may comprise an element of an immersive content viewing system, and vice versa).

In embodiments where the apparatus 100 comprises an immersive content viewing system, an immersive content consumption module (e.g., user interface) 108 may be provided. The immersive content consumption module 108 may, in turn, be in communication with processor 102 to provide output to a user. In this regard, the immersive content consumption module 108 may comprise a head-mounted device (e.g., the Oculus Rift™ or the like) comprising one or more displays configured to render the immersive content for viewing by a user. In some embodiments, the immersive content consumption module 108 may further provide user tracking functionality, such as, for instance, head tracking functionality indicating movement of the user's head. Moreover, the immersive content consumption module 108 may further include elements enabling user feedback, such as touch areas, a microphone, a speaker, or other input/output mechanisms. Alternatively or additionally, the processor 102 may comprise immersive content interface circuitry configured to control at least some functions of one or more elements of the immersive content consumption module 108, such as the one or more displays and, in some embodiments, a speaker, ringer, microphone, and/or the like. The processor 102 and/or immersive content interface circuitry comprising the processor 102 may be configured to control one or more functions of the one or more elements of the immersive content consumption module 108 through computer program instructions (e.g., software and/or firmware) stored on a memory accessible to processor 102 (e.g., memory 104, and/or the like).

In embodiments where the apparatus 100 comprises an immersive content serving system, an immersive content serving module 110 may be provided. The immersive content serving module 110 may, in turn, retrieve data from a memory (e.g., memory 104) or from an immersive content capturing module (which may in some embodiments be an element of the apparatus 100, or which may alternatively be an element of a separate device), and may further utilize communication interface 106 to transmit immersive content from apparatus 100 to another device. In this regard, the immersive content serving module 110 may be any means such as a device or circuitry embodied in either hardware or a combination of hardware and software that is configured to receive and deliver immersive content. In this regard, in some embodiments the processor 102 may comprise immersive content serving circuitry configured to control at least some functions of one or more elements of the immersive content serving module 110. The processor 102 and/or immersive content interface circuitry comprising the processor 102 may be configured to control one or more functions of the one or more elements of the immersive content serving module 110 through computer program instructions (e.g., software and/or firmware) stored on a memory accessible to processor 102 (e.g., memory 104, and/or the like).

In some embodiments where the apparatus 100 comprises an immersive content serving system, the apparatus 100 may also include an immersive content capturing module 112. The immersive content capturing module 112 may comprise means for capturing multiple simultaneous images or video or otherwise generating multidirectional content, and in some embodiments, may also include means for capturing corresponding audio. The means for generating multidirectional content may comprise multiple cameras. In such embodiments, each camera may include all hardware (for example, a lens or other optical component(s), image sensor, image signal processor, and/or the like) and software necessary for creating a digital image file from a captured image. Alternatively, several of the multiple cameras may utilize some common hardware to perform these functions. In some embodiments, the means for generating multidirectional content may comprise means for generating virtual camera views (e.g., when representing an in-game virtual environment, virtual views may be generated by a processor (e.g., processor 102 or the like) executing software (stored, for instance, in memory 104), rather than by capturing these views using a series of cameras), in which case the term "camera view" may simply refer to a particular virtual view. Regardless of how the immersive content is captured (e.g., via camera capture or computer generation), the captured immersive content may subsequently be stored or transmitted by a local or remote memory (e.g., memory 104 or the like).

As noted previously, embodiments of the present invention comprise various means for providing bandwidth-efficient streaming of immersive content. Below, further discussion is provided regarding procedures used by the immersive content serving system and the immersive content viewing system to optimize bandwidth consumption.

System for Bandwidth-Efficient Consumption of Immersive Content

Figure 2B:
FIG. 2B illustrates a user wearing an immersive content consumption device (e.g., a virtual reality (VR) headset) configured to receive streamed immersive content, in accordance with example embodiments of the present invention.
Figure 2A:
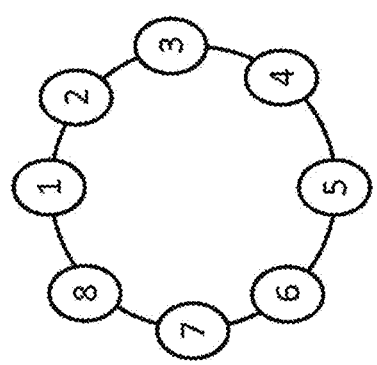
FIG. 2A illustrates a diagram illustrating an immersive content capture device including a series of multiple cameras, in accordance with example embodiments of the present invention.

Currently, immersive content is consumed with local playback. To do this, an immersive content serving system may be provided that transmits immersive content (e.g., content captured from multiple different cameras). In the example provided illustrated in FIG. 2A, an immersive content capturing module may utilizes a series of cameras (e.g., eight cameras (labeled 1 to 8), as shown in FIG. 2A). At any given point in time, content from a subset of the cameras (e.g., cameras 1 and 2) is rendered to the user using an immersive content viewing system. It should be understood that the particular subset of cameras from which content is drawn depends on the user's head position. If the user's head moves (as detected with the help of head tracking technology that may be a part of or additional to the immersive content viewing system), the content rendered to the user changes and is taken from a different subset of cameras (e.g., the adjacent subset of cameras including cameras 2 and 3). The number of cameras and their topology illustrated in FIG. 2A are provided as an example, and the same procedure may be applied using different form factors and/or numbers of cameras. In this regard, omnidirectional content is contemplated in several embodiments contemplated herein. For instance, given a set of N cameras, the N cameras need not be arranged in a circular fashion on a single plane, but may distributed among K planes in 3D space, such as in a spherical arrangement, or other 3D multi-planar arrangement.

Figure 3:
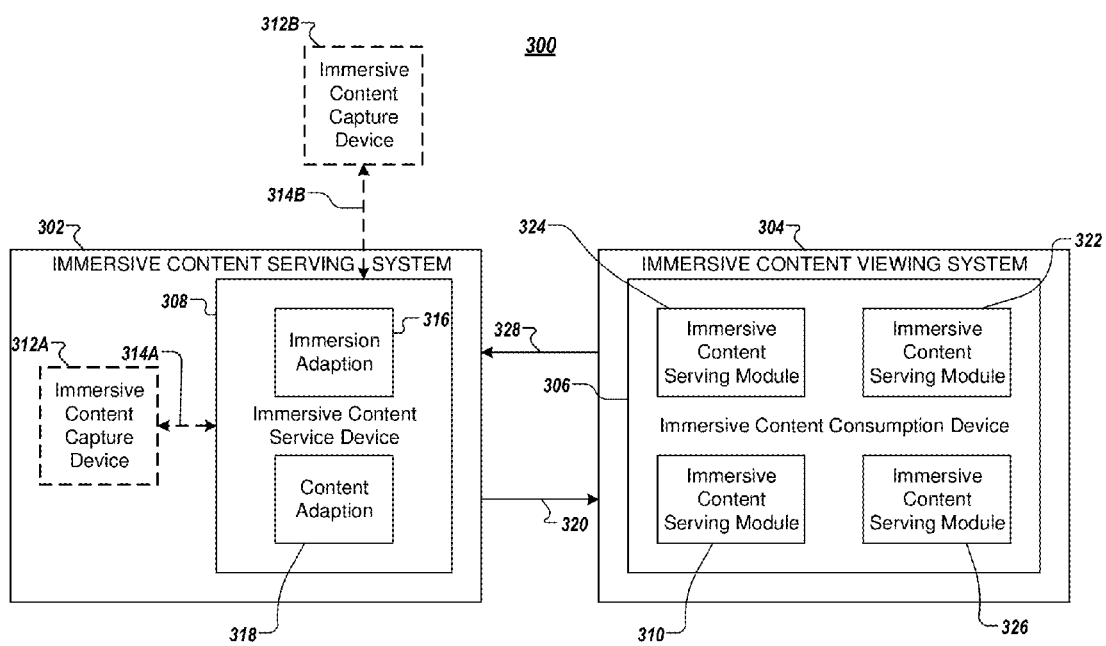
FIG. 3 illustrates an end-to-end system that enables bandwidth-efficient consumption of immersive content, in accordance with example embodiments of the present invention.

Turning now to FIG. 3, an overview is provided of an example end-to-end system 300 that enables bandwidth-efficient consumption of immersive content. The end-to-end system 300 comprises an immersive content serving system 302 and an immersive content viewing system 304, as mentioned previously. The immersive content serving system 302 receives information regarding the content to be streamed to the immersive content viewing system 304. The immersive content viewing system 304 includes or resides on a consumption device 306. Utilizing multiple buffers to accommodate different portions of the immersive content at different levels of quality, the end-to-end system 300 facilitates free view point exploration of immersive content without any disruptions in the viewing experience. More specifically, this result is achieved by the immersive content viewing system 304, which reacts to user movement, transmitting appropriate signaling parameters to a streaming server 308 and utilizing those signaling parameters with buffer management module 310.

Optionally, the immersive content serving system 302 may include an immersive content capture device 312A, which captures the visual content that is subsequently transmitted to the immersive content viewing system 304. In other embodiments, however, the immersive content capture device 312B need not be located within the immersive content serving system 302, and the immersive content serving system 302 may instead store raw data (e.g., VR media streams) that have previously been captured by a separate device and transmitted to the immersive content serving system 302 for storage. In yet further embodiments, the raw data may be stored by a separate storage system (e.g., a mass memory or the like, which may be local or remote), and may be retrieved by the immersive content serving system 302 when needed. In any of these embodiments, however, once the immersive content serving system 302 acquires the raw data, it may then transmit (e.g., stream) the raw data to the immersive content viewing system 304. As shown at 314A and 314B, the raw data regarding each of the plurality of camera views may be sent—from the immersive content capturing module 312A or 312B, respectively—to the streaming server 308, which is also an element of the immersive content serving system 302. In some embodiments, an immersive content capturing module and the streaming server 308 are parts of a single device, although in other embodiments, they are separate devices that are merely in communication with each other. The streaming server 308 may comprise two modules. The first is the immersion adaptation module 316, which receives information from the immersive content consumption device 306. This received information comprises, for instance, signaling messages regarding updates to the correspondence between one or more of the multiple camera views and the CVB and PFB, or signaling messages to pause or restart transmission of immersive content corresponding to the CVB and PFB based on utilization of the FVB. All of these signaling messages may be stored by the immersion adaptation module 316 in a memory (e.g., memory 104). The second module in the streaming server 308 is the content adaptation module 318, which, as shown by the arrow 320, encodes/packetizes and streams the appropriate content to the immersive content consumption device 306.

In addition to the immersive content serving system 302, the end-to-end system 300 includes an immersive content viewing system 304, which resides on the immersive content consumption device 306. The immersive content viewing system 304 comprises at least four modules: a head-tracking module 322; an immersive interactions-dependent adaptations module 324; the buffer management module 310, and a content playback module 326.

The immersive content consumption device 306 uses sensor information to track the user's head movements. To do this, the immersive content consumption device 306 includes head tracking module 320, which determines a sub-region of the omnidirectional or immersive content that is being consumed by the viewer.

Figure 5A:
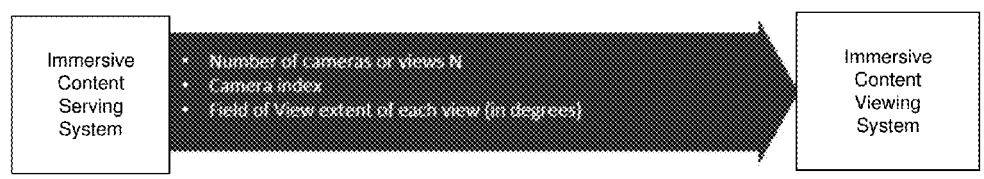
FIGS. 5A-5E illustrate signaling performed between an immersive content serving system and an immersive content viewing system, in accordance with example embodiments of the present invention.

The immersive interactions-dependent adaptations module 324 contains the logic for selecting appropriate camera views depending on the user's head movement (e.g., its direction, speed, etc.) as well as on a correspondence between the user's current field of view and one or more of the sensors included in the immersive content capture device 312. As shown in FIG. 5A below, this information regarding the correspondence between a user's field of view and a particular subset of sensors may be transmitted by the immersive content serving system 302 (e.g., via content adaptation module 318) to the immersive content viewing system 304. As shown at 328, the immersive interactions-dependent adaptations module 324 is also responsible for controlling the signaling of consumption device state information to the streaming server 308.

The buffer management module 310 controls the creation, maintenance and purging of the CVB, PFB and FVB buffers. The buffer management module 310 keeps track of the individual buffer states so that these different buffers are in synch. Tracking the buffer states is essential to ensuring a seamless experience while switching consumption states (between, for instance, static viewing, slow movements, and fast movements) due to immersive interactions (such as head movements). The buffer management module 310 may further hold a frame level marker for each of the buffers during playback, to ensure minimal discontinuity while switching from CVB to PFB, PFB to FVB, or FVB to either CVB or PFB.

Finally, the content playback module 326 is responsible for audio-visual content playback. The content playback module 326 additionally is configured to compensate in terms of delay concealment (e.g., by using PFB or FVB buffers to render content in response to head movement, the delay in buffering high quality CVB data can be concealed), to ensure a seamless playback experience. The content playback module 326 takes the frame number level information from the buffers, as well as the head movement information, to flush old view data (if any) and switch the playback buffer to a new view.

FIGS. 4A, 4B, and 4C illustrate the three types of buffers (CVB, PFB and FVB), respectively. The buffer lengths of these buffers and the quality of content stored in these buffers are defined based on the memory availability of the immersive content consumption device 306, network bandwidth and expected round trip delay times (RTTs) for transmission of signaling information between the immersive content consumption device 306 to the streaming server 308.

FIG. 4A illustrates a CVB. In this regard, it should be understood that the CVB buffer length is decided based on conventional streaming methodology. Some example embodiments described herein require a feedback mechanism that provides a frame level buffer playback pointer that is utilized by the buffer management module to facilitate a switch to PFB or FVB from CVB.

FIG. 4B illustrates a PFB. Each PFB consists of a circular buffer of specific duration length, and the length of this buffer should ideally be greater than RTT/2 to ensure a seamless transitioning to CVB from PFB in case the head position remains positioned in the direction of a camera view associated with the PFB. The time RTT/2 is determined by the minimum time needed to inform the streaming server 308 of the conversion of the PFB view to CVB quality. In some embodiments, the CVB and PFB may have the same quality, in which case the signaling to the streaming server 308 for switching the view quality will not be needed, and only localized buffer-reshaping would be required. In this regard, a PFB can have a shorter-duration buffer than a CVB, because the PFB is meant only to provide a transition functionality. If the PFB and CVB both have the same quality content, then upon changing a designation of a particular buffer view from a PFB to a CVB, the buffer length may either be increased or the previous CVB memory may be reassigned to the new CVB. It should be understood that there may be more than one PFB, and the number of PFBs used in any given embodiment may depend on a variety of factors, such as the number of cameras used in the immersive content capture device 312A or 312B, as well as the memory availability of the immersive content consumption device 306, the network bandwidth, and the expected RTTs for transmission of signaling information between the immersive content consumption device 306 and the streaming server 308.

FIG. 4C illustrates the FVB. The FVB is a continuous buffer of limited duration which tracks the current playback position. The FVB buffer allows for free head movement response without content discontinuity, although due to the fact that the FVB stores information regarding all views of the immersive content, the quality of content stored in the FVB is likely lower than the quality of the CVB or PFB. In this regard, the quality of the content stored in the FVB may depend on a variety of factors, such as the number of cameras used in the immersive content capture device 312A or 312B, as well as the memory availability of the immersive content consumption device 306, the network bandwidth, and the expected RTTs for transmission of signaling information between the immersive content consumption device 306 and the streaming server 308.

Turning now to FIGS. 5A through 5E, examples of the signaling performed between the immersive content serving system 302 and the immersive content viewing system 304 are illustrated. This signaling enables the immersive content viewing system 304 to describe the user's immersive interactions (e.g., the user's head movements) to the streaming server 308. This signaling is further utilized to facilitate streaming of appropriate content from the immersive content serving system 302 (e.g., from the streaming server 308 via its content adaptation module 318) to the immersive content viewing system 304, and also to prevent streaming of unnecessary content which may impede the seamless free view point consumption by increasing network latency and/or by causing congestion in the network. The signaling between streaming server 308 and the immersive content consumption device 306 illustrated in each of FIGS. 5A through 5E are described in turn.

FIG. 5A illustrates a signaling message that may be sent by immersive content serving system 302 (e.g., via content adaptation module 318) to the immersive content viewing system 304 (e.g., the buffer management module 310). It should be understood that, as noted previously, in some embodiments, the immersive content serving system 302 may itself include an immersive content capturing module 312A that records media. However, in alternative embodiments, the immersive content serving system 302 may merely include streaming server 308, which can store previously recorded raw data for transmission, or which can gather raw data from a separate immersive content capture module 312B prior to transmission to the immersive content viewing system 304. In any of these embodiments, however, the signaling message illustrated in FIG. 5A may identify the number of available camera views, an indication of a camera index corresponding to each of the available camera views, and the field of view (FOV) extent (in degrees) of each camera view. The FOV extent information allows for determination of thresholds for switching between views, changing a PFB to CVB, or moving from FVB streaming to PFB or CVB streaming (or the reverse).

Figure 5B:
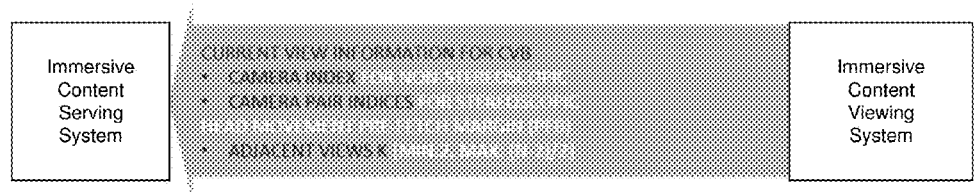

FIG. 5B illustrates a signaling message that may be sent by immersive content viewing system 304 (e.g., via the immersive interactions-dependent adaptations module 324) to the immersive content serving system 302 (e.g., the immersion adaptation module 316) to identify either the initial camera index (for streaming of monoscopic content) or the initial camera pair index (for streaming of stereoscopic immersive content) that should be utilized as the CVB. In addition, this signaling message may indicate the number of camera views that should utilize PFBs. In this regard, as noted in FIG. 5B, when there are N available camera views, there may be K adjacent camera views that utilize the PFB. In some such embodiments, there will be a minimum of 2 adjacent camera views, and a maximum of (N−2)/2 adjacent camera views.

Figure 5C:
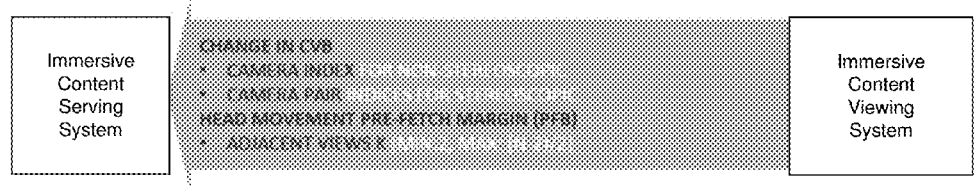

In turn, FIG. 5C illustrates a signaling message that may be sent by immersive content viewing system 304 (e.g., via the immersive interactions-dependent adaptations module 324) to the immersive content serving system 302 (e.g., the immersion adaptation module 316) to instruct the immersive content serving system 302 that a change has occurred in the CVB. The changed CVB may have been triggered by a change in the user's head position to a FOV which is outside the FOX extent of the camera index associated with the prior CVB. This signaling message may be used when the new FOV is covered by an existing PFB, and the signaling message identifies either the camera index (for streaming of monoscopic content) or the camera pair index (for streaming of stereoscopic immersive content) that will be utilized as the new CVB. In this regard, assuming the user's head position stays in the new position, the corresponding PFB may be converted to the CVB, and consequently new PFBs are initiated. In this latter regard, the signaling message may indicate the number of camera views for which to utilize the PFBs. In this regard, as noted in FIG. 5C, when there are N available camera views, there may be K adjacent camera views that utilize the PFB. In some such embodiments, there will be a minimum of 2 adjacent camera views, and a maximum of (N−2)/2 adjacent camera views (e.g., a minimum of one camera on each side of the camera views utilizing the PFB to a maximum of half of all cameras on each side).

Figure 5D:
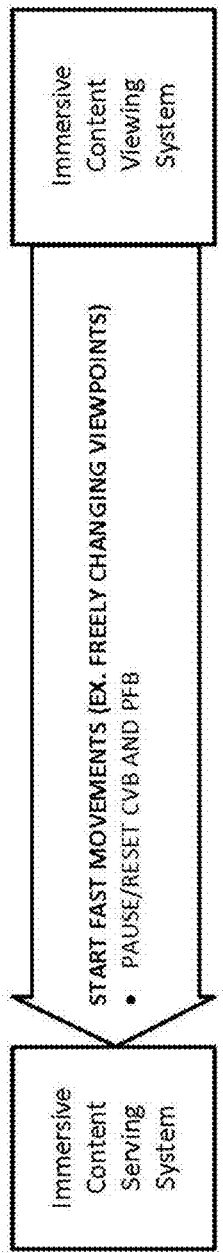

FIG. 5D, in turn, illustrates a signaling message by the immersive content viewing system 304 (e.g., via the immersive interactions-dependent adaptations module 324) to the immersive content serving system 302 (e.g., the immersion adaptation module 316) to instruct the immersive content serving system 302 that fast user head movements are taking place and thus to pause/reset the CVB and PFB streams, since it is not clear which position the user's head will rest for resumption of higher-quality content viewing.

Figure 5E:
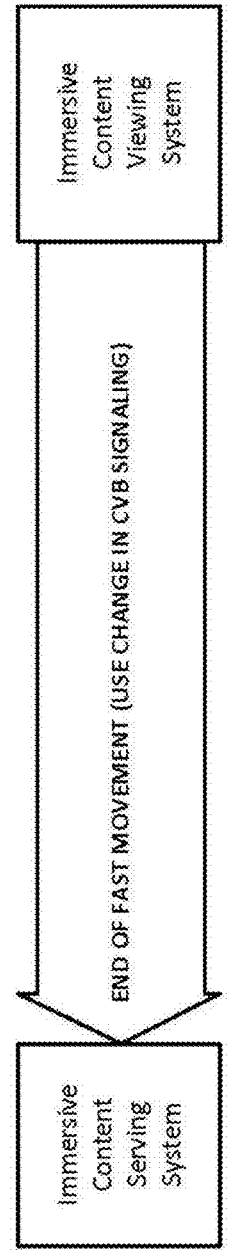

FIG. 5E illustrates a signaling message that may be sent by the immersive content viewing system 304 (e.g., via the immersive interactions-dependent adaptations module 324) to the immersive content serving system 302 (e.g., the immersion adaptation module 316) to instruct the immersive content serving system 302 that the user's fast head movements have slowed to beneath a predetermined threshold. This predetermined threshold may be a hardcoded value in some embodiments, but in other embodiments this predetermined threshold can be included as a signaling parameter. Accordingly, the signaling message illustrated in FIG. 5E may be followed by a signaling message such as that shown in FIG. 5C to effect a change in the CVB (if necessary), identifying, for the immersive content serving system 302, which camera indices correspond to the updated CVB and PFB streams, and instructing the immersive content serving system 302 to initiate transmission in accordance with the new CVB and PFB camera index assignments.

In addition to the above described signaling messages, the immersive content viewing system 304 may signal the current playback position of the several buffers to the streaming server 308 during the transmission of the signaling messages to the streaming server 308. This information allows the streaming server 308 to estimate the margin of time remaining for responding to this particular client. The streaming server 308 may then choose to reduce the quality of one or more of the CVB, PFB, or FVB in order to match the reduced margin.

It should be understood that the FVB is available throughout the streaming session to minimize the drop in quality during free viewpoint movement. During free viewpoint movements, the CVB and PFB may be suspended, but as soon as the user's head movement settles to a specific direction of viewing, the CVB and PFB can be re-initiated. Although the immersive interactions in this implementation are described as user head movements, other type of immersive interactions are contemplated as well, such as user movements relating to the translation between camera views that are in the same direction but having different distances of focus (e.g., camera views associated with multiple depths of field).

The signaling messages from the immersive content viewing system 304 may also include buffer state information (e.g., the size and availability of each buffer). This will allow the streaming server 308 to determine the amount of content to be sent. In some embodiments, to prevent unnecessary data transmission for a particular view (due to the high likelihood of an imminent change in user head position), the CVB buffer length may be signaled to the streaming server 308 by the user of the immersive content viewing system 304 via a separate user interface (not shown in FIG. 3). Additionally, it should be understood that in some example embodiments, the more popular camera views may be provided with larger buffer lengths than other camera views, due to the lower likelihood of a view change away from more popular camera views.

Operations Performed by an Immersive Content Serving System

Figure 6A:
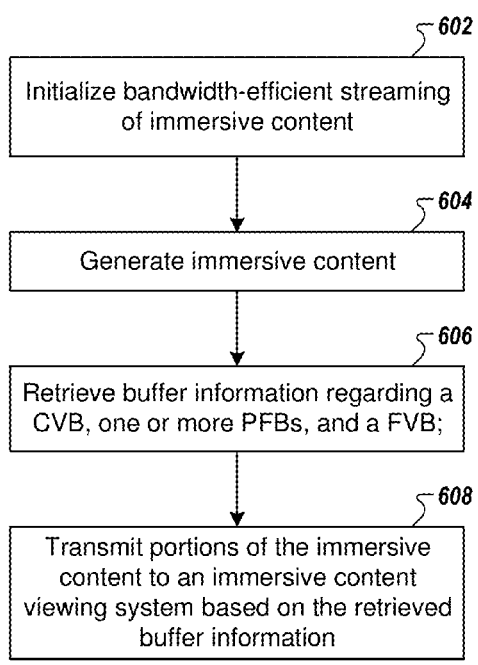
FIGS. 6A and 6B illustrate flowcharts describing example operations performed by an immersive content serving system, in accordance with example embodiments of the present invention.
Figure 6B:
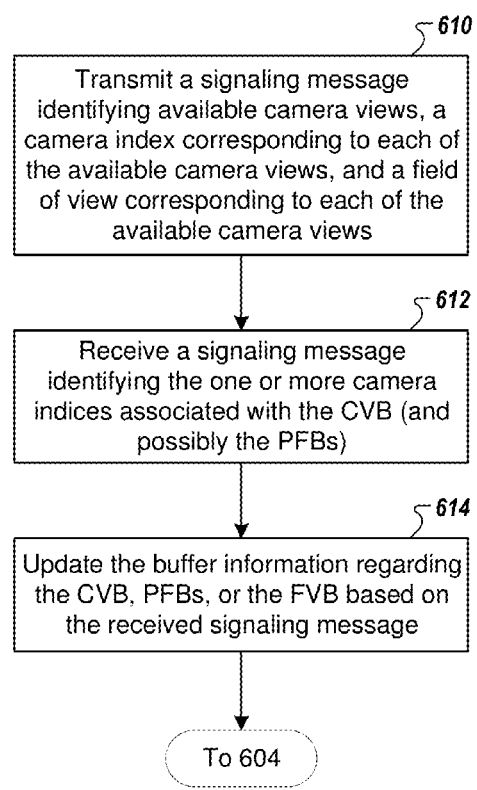

Having provided an overview of the end-to-end system 300 and the signalling messages transmitted to facilitate its use, some example procedures will now be described. Turning to FIGS. 6A and 6B, flowchart are illustrated that contain a series of operations performed by an immersive content serving system 302 to facilitate bandwidth-efficient streaming of immersive content. The operations illustrated in FIGS. 6A and 6B may, for example, be performed by, with the assistance of, and/or under the control of apparatus 100 embodying the immersive content serving system 302, and more particularly through the use of one or more of processor 102, memory 104, communication interface 106, and immersive content serving module 110 and/or immersive content capturing module 112.

In operation 602 the apparatus 100 includes means, such as processor 102, memory 104, communication interface 106, immersive content serving module 110, or the like, for initializing the bandwidth-efficient streaming of immersive content. The initialization operations will be described in greater detail below in connection with FIG. 6B.

Turning to operation 604, the apparatus 100 includes means, such as processor 102, immersive content capturing module 112, or the like, for causing generation of immersive content by an immersive content capture device. As noted previously, the immersive content capture device may be an element of the apparatus 100 or may be separate from the apparatus 100. In some embodiments, generation of the immersive content may be performed in advance and the apparatus 100 may simply store the previously generated immersive content, and in such embodiments operation 604 may occur as a separate process in advance of the remaining operations below, or operation 604 may not occur at all if the immersive content was not captured at the instruction of the apparatus 100.

In operation 606 the apparatus 100 includes means, such as processor 102, memory 104, communication interface 106, or the like, for retrieving buffer information regarding a CVB, one or more PFBs, and a FVB associated with a particular immersive content viewing system 304. It should be understood that this buffer information is populated in the initialization operations described below in connection with FIG. 6B.

In operation 608 the apparatus 100 includes means, such as processor 102, memory 104, communication interface 106, immersive content serving module 110, or the like, for causing transmission of portions of the immersive content to an immersive content viewing system based on the retrieved buffer information regarding the CVB, the one or more PFBs, and the FVB. In this regard, the apparatus 100 may utilize a content adaptation module 318 to generate the portions of the immersive content to transmit based on the retrieved buffer information. In this regard, the content adaptation module 318 may transmit high quality content regarding camera views associated with the CVB, high or medium quality content regarding camera views associated with the one or more PFBs, and lower-quality content regarding all camera views, for storage in the FVB buffer. However, it should be understood that the content quality transmitted may depend on network conditions, and that this content quality may in some embodiments be determined by the apparatus or, in other embodiments, by the immersive content viewing system 304 (in which case an indication of the determined content quality level may be received from the immersive content viewing system 304 during initialization of the bandwidth-efficient streaming of immersive content). Regardless of network conditions, though, by transmitting less than the entirety of the immersive content, operation 608 reduces the bandwidth requirement for streaming the immersive content.

Accordingly, turning now to FIG. 6B, operations for initialization of the bandwidth-efficient streaming system are described. In operation 610, the apparatus 100 includes means, such as processor 102, memory 104, communication interface 106, immersive content serving module 110 or the like, for causing transmission of a signaling message identifying available camera views, a camera index corresponding to each of the available camera views, and a field of view corresponding to each of the available camera views. This information advises the immersive content viewing system 304 of the technical specifications of the immersive content capturing device 312, thus enabling the immersive content viewing system 304 to develop appropriate buffer correspondences.

In operation 612 the apparatus 100 includes means, such as processor 102, memory 104, communication interface 106, or the like, for receiving, by the immersion adaptation module and from the immersive content viewing system 304, a signaling message regarding one or more of the CVB, the one or more PFBs, or the FVB. In various embodiments, this signaling message may take a number of forms. For instance, the signaling message may identify one or more camera indices associated with the CVB and/or one or more one or more camera indices associated with the one or more PFBs. Alternatively, the signaling message may indicate a content quality level selected by the immersive content viewing system 304, which may be utilized during selection of the immersive content to transmit to the immersive content viewing system 304 in operation 608. As yet another alternative, the signaling message may indicate a change in a user's head orientation, which the apparatus 100 may utilize to identify and/or revise the camera indices associated with the CVB, and/or the one or more camera indices associated with the one or more PFBs. In some embodiments, signaling messages received from the immersive content viewing system 304 indicates utilization of the FVB (e.g., because the user's head has begun to move quickly) and thus instructs the streaming server to pause transmission of the portions of the immersive content corresponding to the CVB or the one or more PFBs. Subsequent signaling messages received from the immersive content viewing system 304 may then instruct the streaming server to resume transmission of the portions of the immersive content corresponding to the CVB or the one or more PFBs (e.g., in a circumstance in which the user's head movements have slowed to below a predetermined threshold).

In operation 614 the apparatus 100 includes means, such as processor 102, memory 104, communication interface 106, immersive content serving module 110, or the like, for updating, by an immersion adaptation module, the buffer information regarding the CVB, PFBs, or the FVB based on the received signaling message.

Operations Performed by an Immersive Content Viewing System

Figure 7:
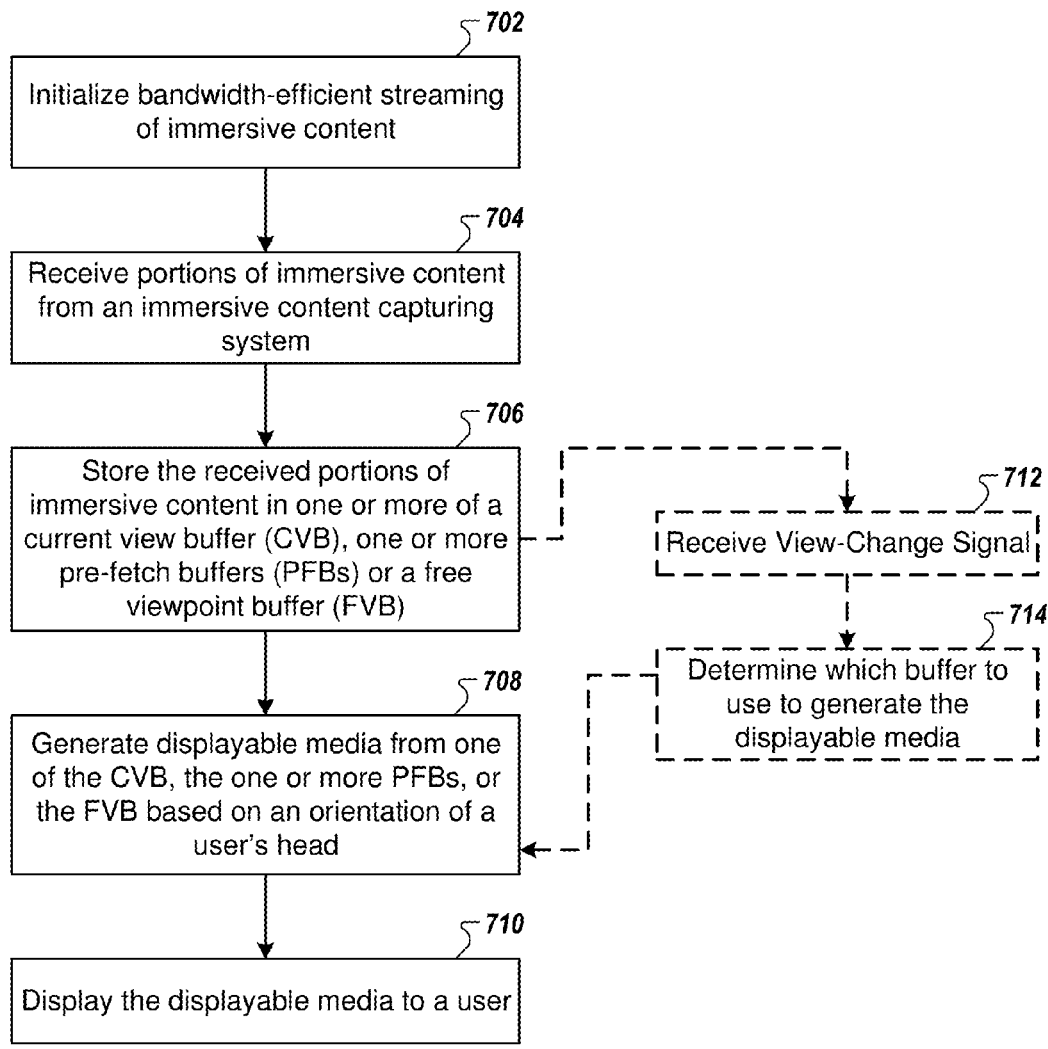
FIGS. 7 and 8 illustrate flowcharts describing example operations performed by an immersive content viewing system, in accordance with example embodiments of the present invention.
Figure 8:
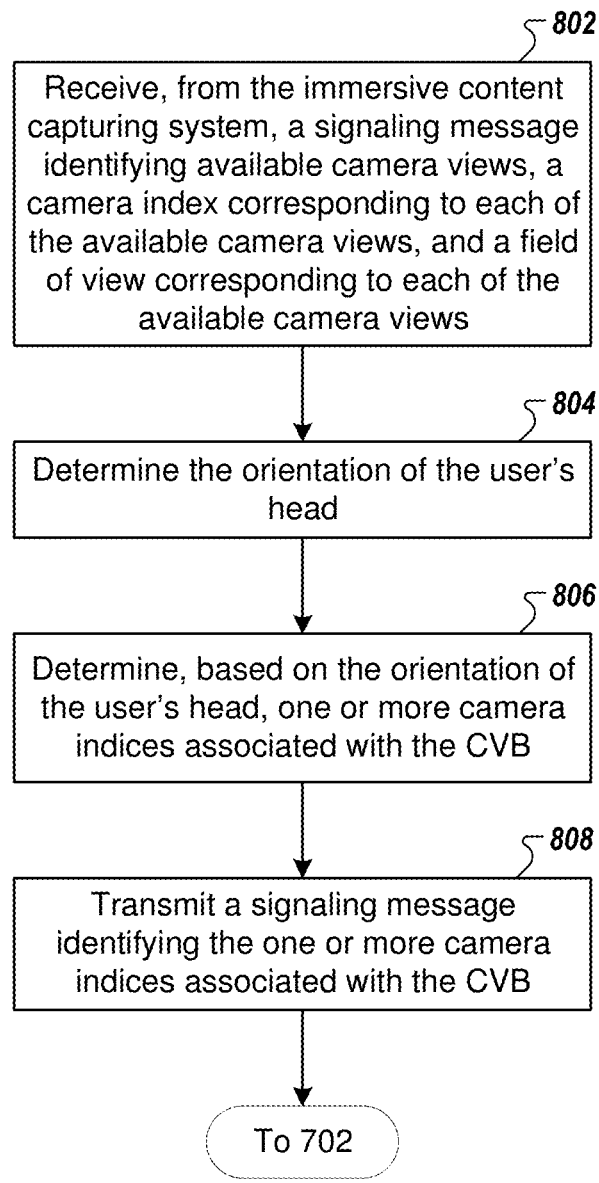

Turning to FIGS. 7 and 8, flowcharts are illustrated that contains a series of operations performed by an immersive content viewing system 304 to facilitate bandwidth-efficient streaming of immersive content. The operations illustrated in FIGS. 7 and 8 may, for example, be performed by, with the assistance of, and/or under the control of apparatus 100, which in this case may embody the immersive content viewing system 304, and more particularly, through the use of one or more of processor 102, memory 104, communication interface 106, or immersive content consumption module 108.

In operation 702 the apparatus 100 includes means, such as processor 102, memory 104, communication interface 106, immersive content consumption module 108, or the like, for initializing the bandwidth-efficient streaming of immersive content. The initialization operations will be described in greater detail below in connection with FIG. 8.

In operation 704 the apparatus 100 includes means, such as processor 102, memory 104, communication interface 106, immersive content consumption module 108, or the like, for receiving portions of immersive content from an immersive content serving system. The transmission of these portions of immersive content are described above in connection with FIGS. 6A and 6B.

In operation 706 the apparatus 100 includes means, such as processor 102, memory 104, communication interface 106, immersive content consumption module 108, or the like, for storing the received portions of immersive content in one or more of a CVB, one or more PFBs or a FVB.

In operation 708 the apparatus 100 includes means, such as processor 102, memory 104, communication interface 106, immersive content consumption module 108, or the like, for causing generation of displayable media from one of the CVB, the one or more PFBs or the FVB based on an orientation of a user's head. In the absence of a signal indicating that the user's head has a revised orientation, operation 708 may generate the displayable media from the CVB.

In operation 710 the apparatus 100 includes means, such as processor 102, memory 104, communication interface 106, immersive content consumption module 108, or the like, for causing display, by an immersive content consumption device, of the displayable media.

From operation 706, the procedure may advance to optional operation 712, in which the apparatus 100 may include means, such as immersive content consumption module 108 or the like, for receiving a view-change signal indicating a revised orientation of the user's head.

In response to receiving the view-change signal in operation 712, the procedure advances to operation 714. In operation 714 the apparatus 100 includes means, such as processor 102, memory 104, communication interface 106, immersive content consumption module 108, or the like, for determining which buffer to use for generating the displayable media. In this regard, the apparatus 100 may first determine whether the revised orientation of the user's head aligns with fields of view corresponding to the one or more camera indices associated with the CVB. If so, then the apparatus 100 may proceed to operation 708 for generation of the displayable media based on the CVB.

However, when the revised orientation of the user's head does not align with a field of view associated with the one or more camera indices associated with the CVB, the apparatus 100 must determine whether to use one of the PFBs or the FVB to generate the displayable media. Accordingly, the apparatus 100 may causing determination of whether the revised orientation of the user's head aligns with a field of view corresponding to the one or more camera indices associated with one of the PFBs. If so, then the apparatus 100 may proceed to operation 708 for generation of the displayable media based on the identified PFB. If not, however, then the apparatus 100 proceeds to operation 708 for generation of the displayable media based on the FVB. In this fashion, no matter how severe the user's head movement is, the apparatus 100 will be able to generate displayable media corresponding to a revised orientation of the user's head.

It should be noted that, when causing generation of the displayable media from one of the PFBs, operation 714 may further include means, such as communication interface 106, or the like, for causing transmission of a CVB change signaling message instructing the immersive content serving system to associate, with the CVB, the one or more camera indices associated with the one of the PFBs from which the displayable media was generated. In this regard, if the user's head has changed orientation, then the current view must be updated accordingly.

As an alternative, operation 714 need not identify which buffer to utilize based on the change in user head position. Rather, that determination may be made in such embodiments by the immersive content serving system 302, in which case operation 714 merely identifies the change in user head position.

As yet another alternative, operation 714 may instead include identification, by the apparatus 100, of a content quality level to be utilized during selection of the immersive content to transmit to the immersive content viewing system 304 in operation 608 described above. In this regard, such embodiments may utilize a protocol such as MPEG-DASH to convey this information to the immersive content serving system 302.

However, when the displayable media is generated from the FVB, this may be interpreted as a signal that the CVB and the one or more PFBs will no longer be accurate representations of the current or adjacent views. Accordingly, operation 714 may further include means, such as communication interface 106, or the like, for causing transmission of a "pause" signaling message instructing the immersive content serving system 302 to pause transmission of portions of immersive content associated with the CVB or with the one or more PFBs. Subsequently, once the user's head movement slows to below a predetermined threshold, operation 714 may further include means, such as communication interface 106, or the like, for causing transmission of a "resume" signaling message instructing the immersive content serving system 302 to re-initiate transmission of portions of immersive content associated with the CVB or with the one or more PFBs.

Turning now to FIG. 8, initialization of the bandwidth-efficient streaming of immersive content will be described in greater detail. In operation 802, the apparatus 100 includes means, such as processor 102, memory 104, communication interface 106, immersive content consumption module 108, or the like, for receiving, from the immersive content serving system, a signaling message identifying available camera views, a camera index corresponding to each of the available camera views, and a field of view corresponding to each of the available camera views.

In operation 804 the apparatus 100 includes means, such as processor 102, memory 104, communication interface 106, immersive content consumption module 108, or the like, for causing determination, by a head tracking module, of the orientation of the user's head.

In operation 806 the apparatus 100 includes means, such as processor 102, memory 104, communication interface 106, or the like, for causing determination, by an immersive interactions-dependent adaptations module and based on the orientation of the user's head, of one or more camera indices associated with the CVB. In some embodiments, this operation may further include causing determination, based on the orientation of the user's head, of one or more camera indices associated with the one or more PFBs.

In operation 808 the apparatus 100 includes means, such as processor 102, memory 104, communication interface 106, or the like, for causing transmission, by the immersive interactions-dependent adaptations module, of a signaling message identifying the one or more camera indices associated with the CVB. In embodiments in which operation 806 included the determination of camera indices associated with the one or more PFBs, the signaling message of operation 808 may additionally identify the one or more camera indices associated with one or more PFBs. In any event, following the conclusion of operation 808, the procedure returns to operation 704, described previously.

As described above, example embodiments provide methods, apparatuses, and computer program products for bandwidth-efficient streaming of immersive content that addresses the above requirements without compromising the immersive user experience. As described above, example embodiments utilize multiple buffers that store different portions of the immersive content at different levels of quality. By buffering a variety of portions of the immersive content at a variety of levels of quality, example embodiments facilitate free view point exploration of immersive content without any disruptions in the viewing experience. Accordingly, example embodiments provide a seamless consumption experience while maintaining bandwidth efficiency. Moreover, example embodiments enabling the signaling of immersive content consumption device states to a streaming server. Building on this functionality, example embodiments may be further extended to add signaling messages relating to o types of immersive interactions, such as like zoom in or zoom out operations.

As described above, FIGS. 6A through 8 illustrate flowcharts describing the operation of an apparatus, method, and computer program product according to example embodiments of the invention. It will be understood that each flowchart block, and combinations of flowchart blocks, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions that embody the procedures described above may be stored by a memory 104 of an apparatus 100 employing an embodiment of the present invention and executed by a processor 102 of the apparatus 100. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will also be understood that one or more flowchart blocks, and combinations of flowchart blocks, can be implemented by special purpose hardware-based computer systems which preform the specified functions, or combinations of special purpose hardware and computer instructions.

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for bandwidth-efficient streaming of immersive content, the method comprising:
   causing generation of immersive content by a processor;
   retrieving, from a memory, buffer information regarding a current view buffer (CVB), one or more pre-fetch buffers (PFBs), and a free viewpoint buffer (FVB), wherein the CVB comprises a current view of the immersive content, the one or more PFBs comprise one or more views that are adjacent to the current view of the immersive content and the FVB comprises one or more views outside of the current view and the one or more views that are adjacent to the current view for provision upon movement of a viewer's head at a speed that satisfies a predetermined threshold, wherein the CVB and PFB store different portions of the immersive content at a different level of quality than the FVB; and causing transmission, by a streaming server, of portions of the immersive content to an immersive content viewing system based on the retrieved buffer information regarding the CVB, the one or more PFBs, and the FVB.

2. The method of claim 1, further comprising:

receiving, by the processor and from an immersive content viewing system, a signaling message regarding one or more of the CVB, the one or more PFBs, or the FVB; and updating, by the processor, the buffer information regarding the CVB, PFBs, or the FVB based on the received signaling message.

3. The method of claim 2, further comprising:

causing transmission, by the streaming server, of a signaling message identifying available camera views, a camera index corresponding to each of the available camera views, and a field of view corresponding to each of the available camera views, wherein the signaling message regarding the one or more of the CVB, the one or more PFBs, or the FVB is received in response to the transmission of the signaling message identifying the available camera views, the camera index corresponding to each of the available camera views, and the field of view corresponding to each of the available camera views.

4. The method of claim 2, wherein the signaling message identifies one or more camera indices to associate with the CVB, one or more camera indices to associate with the one or more PFBs; or both.

5. The method of claim 2, wherein the signaling message further identifies a content quality level, and wherein causing transmission of the portions of the immersive content to an immersive content viewing system is further based on the content quality level.

6. The method of claim 2, wherein the signaling message indicates utilization of the FVB and instructs the streaming server to pause transmission of the portions of the immersive content corresponding to the CVB or the one or more PFBs.

7. The method of claim 2, wherein the signaling message instructs the streaming server to resume transmission of the portions of the immersive content corresponding to the CVB or the one or more PFBs.

8. An apparatus for bandwidth-efficient streaming of immersive content, the apparatus comprising at least one processor and at least one memory including computer program code, the at least one memory and the computer program code configured to, with the at least one processor, cause the apparatus to:

cause generation of immersive content;

retrieve buffer information regarding a current view buffer (CVB), one or more pre-fetch buffers (PFBs), and a free viewpoint buffer (FVB), wherein the CVB comprises a current view of the immersive content, the one or more PFBs comprise one or more views that are adjacent to the current view of the immersive content and the FVB comprises one or more views outside of the current view and the one or more views that are adjacent to the current view for provision upon movement of a viewer's head at a speed that satisfies a predetermined threshold, wherein the CVB and PFB store different portions of the immersive content at a different level of quality than the FVB; and cause transmission of portions of the immersive content to an immersive content viewing system based on the retrieved buffer information regarding the CVB, the one or more PFBs, and the FVB.

9. The apparatus of claim 8, wherein the at least one memory and the computer program code are further configured to, with the at least one processor, cause the apparatus to:

receive, from an immersive content viewing system, a signaling message regarding one or more of the CVB, the one or more PFBs, or the FVB; and update the buffer information regarding the CVB, PFBs, or the FVB based on the received signaling message.

10. The apparatus of claim 9, wherein the at least one memory and the computer program code are further configured to, with the at least one processor, cause the apparatus to:

cause transmission of a signaling message identifying available camera views, a camera index corresponding to each of the available camera views, and a field of view corresponding to each of the available camera views, wherein the signaling message regarding the one or more of the CVB, the one or more PFBs, or the FVB is received in response to the transmission of the signaling message identifying the available camera views, the camera index corresponding to each of the available camera views, and the field of view corresponding to each of the available camera views.

11. A method for bandwidth-efficient streaming of immersive content, the method comprising:

receiving portions of immersive content from an immersive content serving system;

storing the received portions of immersive content in one or more of a current view buffer (CVB), one or more pre-fetch buffers (PFBs) or a free viewpoint buffer (FVB), wherein the CVB comprises a current view of the immersive content, the one or more PFBs comprise one or more views that are adjacent to the current view of the immersive content and the FVB comprises one or more views outside of the current view and the one or more views that are adjacent to the current view for provision upon movement of a viewer's head at a speed that satisfies a predetermined threshold, wherein the CVB and PFB store different portions of the immersive content at a different level of quality than the FVB;

causing generation of displayable media from one of the CVB, the one or more PFBs or the FVB based on an orientation of a user's head; and causing display, by an immersive content consumption device, of the displayable media.

12. The method of claim 11, further comprising:

receiving, from the immersive content serving system, a signaling message identifying available camera views, a camera index corresponding to each of the available camera views, and a field of view corresponding to each of the available camera views;

causing determination, by a processor, of the orientation of the user's head;

causing determination, by the processor and based on the orientation of the user's head, of one or more camera indices associated with the CVB, the one or more PFBs, or both; and causing transmission, by the processor, of a signaling message identifying the one or more camera indices associated with the CVB, the one or more PFBs, or both, wherein receiving the portions of the immersive content from the immersive content serving system occurs in response to transmission of the signaling message identifying the one or more camera indices associated with the CVB, the PFBs, or both.

13. The method of claim 12, wherein the signaling message identifying the one or more camera indices associated with the CVB, the one or more PFBs, or both further identifies a content quality level, and wherein the received portions of the immersive content to an immersive content viewing system are based on the content quality level.

14. The method of claim 12, further comprising:
receiving, from the processor, a view-change signal indicating a revised orientation of the user's head; and
causing determination of whether the revised orientation of the user's head aligns with fields of view corresponding to the one or more camera indices associated with the CVB,
wherein, in an instance in which the revised orientation of the user's head aligns with the fields of view corresponding to the one or more camera indices associated with the CVB, causing generation of the displayable media comprises causing generation of the displayable media from the CVB.

15. The method of claim 14, wherein, in an instance in which the revised orientation of the user's head does not align with a field of view associated with the one or more camera indices associated with the CVB, causing generation of the displayable media comprises:
causing determination of whether the revised orientation of the user's head aligns with a field of view corresponding to the one or more camera indices associated with one of the PFB s;
in an instance in which the revised orientation of the user's head aligns with a field of view corresponding to the one or more camera indices associated with one of the PFBs, causing generation of the displayable media from one of the PFBs; and
in an instance in which the revised orientation of the user's head does not align with a field of view corresponding to the one or more camera indices associated with one of the PFBs, causing generation of the displayable media from the FVB.

16. The method of claim 15, wherein, in response to causing generation of the displayable media from one of the PFBs, the method further comprises:
causing transmission, by the processor, of a CVB change signaling message instructing the immersive content serving system to associated, with the CVB, the one or more camera indices associated with the one of the PFBs from which the displayable media was generated.

17. The method of claim 15, wherein, in response to causing generation of the displayable media from the FVB, the method further comprises:
causing transmission, by the processor, of a pause signaling message instructing the immersive content serving system to pause transmission of portions of immersive content associated with the CVB or with the one or more PFBs.

18. An apparatus for bandwidth-efficient streaming of immersive content, the apparatus comprising at least one processor and at least one memory including computer program code, the at least one memory and the computer program code configured to, with the at least one processor, cause the apparatus to:
receive portions of immersive content from an immersive content serving system;
store the received portions of immersive content in one or more of a current view buffer (CVB), one or more pre-fetch buffers (PFBs) or a free viewpoint buffer (FVB), wherein the CVB comprises a current view of the immersive content, the one or more PFBs comprise one or more views that are adjacent to the current view of the immersive content and the FVB comprises one or more views outside of the current view and the one or more views that are adjacent to the current view for provision upon movement of a viewer's head at a speed that satisfies a predetermined threshold, wherein the CVB and PFB store different portions of the immersive content at a different level of quality than the FVB;
cause generation of displayable media from one of the CVB, the one or more PFBs or the FVB based on an orientation of a user's head; and
cause display of the displayable media to a user.

19. The apparatus of claim 18, wherein the at least one memory and the computer program code are further configured to, with the at least one processor, cause the apparatus to:
receive, from the immersive content serving system, a signaling message identifying available camera views, a camera index corresponding to each of the available camera views, and a field of view corresponding to each of the available camera views;
cause determination of the orientation of the user's head;
cause determination, based on the orientation of the user's head, of one or more camera indices associated with the CVB; and
cause transmission of a signaling message identifying the one or more camera indices associated with the CVB,
wherein the at least one memory and the computer program code are further configured to, with the at least one processor, cause the apparatus to receive the portions of the immersive content from the immersive content serving system occurs in response to transmission of the signaling message identifying the one or more camera indices associated with the CVB.

20. The apparatus of claim 19, wherein the at least one memory and the computer program code are further configured to, with the at least one processor, cause the apparatus to:
cause determination, based on the orientation of the user's head, of one or more camera indices associated with the one or more PFBs,
wherein the signaling message identifying the one or more camera indices associated with the CVB further identifies the one or more camera indices associated with one or more PFBs.

* * * * *